(12) United States Patent
Chung-Che

(10) Patent No.: US 6,202,502 B1
(45) Date of Patent: Mar. 20, 2001

(54) BRAKE MECHANISM FOR AUXILIARY WALKER

(75) Inventor: Sung Chung-Che, Taichung (TW)

(73) Assignee: Genemax Medical Products Industry Corp., Taichung (TW)

( * ) Notice: Subject to any disclaimer, the term of this patent is extended or adjusted under 35 U.S.C. 154(b) by 0 days.

(21) Appl. No.: 09/299,989

(22) Filed: Apr. 27, 1999

(51) Int. Cl.⁷ .................................................. F16C 1/10
(52) U.S. Cl. .......................... 74/502.2; 74/489; 74/526; 74/529
(58) Field of Search .................... 74/502.2, 489, 74/526, 529

(56) References Cited

U.S. PATENT DOCUMENTS

| | | | |
|---|---|---|---|
| 2,555,207 | * 5/1951 | Trevaskis | 74/502.2 |
| 4,704,044 | * 11/1987 | Yoshigai | 74/502.2 |
| 5,279,180 | * 1/1994 | Henriksson | 74/502.2 |
| 5,664,460 | * 9/1997 | Hewson | 74/502.2 |
| 5,669,268 | * 9/1997 | Tsai | 74/489 |
| 5,845,539 | * 12/1998 | Huang | 74/489 |
| 5,865,065 | * 2/1999 | Chiu | 74/502.2 |
| 5,878,625 | * 3/1999 | Hu | 74/502.2 |
| 5,954,161 | * 9/1999 | Lee | 74/502.2 |
| 6,032,765 | * 3/2000 | Hsi-Chia | 74/502.2 |

\* cited by examiner

*Primary Examiner*—David A. Bucci
*Assistant Examiner*—Chong H. Kim
(74) *Attorney, Agent, or Firm*—Harrison & Egbert

(57) ABSTRACT

A brake mechanism for auxiliary walker has a fixed seat, a control plate and a hand grip. The fixed seat is hollow at an inner portion of a handle at one top end thereof. The control plate has formed horizontal guide hole at bottom one side and further formed a fixed hole at bottom one surface. The hand grip is provided with a long trough hole at one end thereof providing the control plate to insert in. The control plate together with said hand grip are all be inserted into the fixed seat fastening by plurality screws at the top end of control plate and fixed seat.

1 Claim, 6 Drawing Sheets

BRAKE MECHANISM FOR AUXILIARY WALKER

FIELD OF THE INVENTION

The present invention relates generally to an auxiliary walker, and more particularly to a brake mechanism for auxiliary walker.

BACKGROUND OF THE INVENTION

As illustrated in FIG. 1, the brake control device of a conventional auxiliary walker is from the brake theory of bicycles. Such device is defective in design as described below:

1. The user who needs to use an auxiliary walker is generally a hospital patient or an old person. In order to prevent the walker from sliding the user should hold the brake 10 continually in use if she or he wants to stand up or to slow down the speed. Such holding of the brake continually will cause the user to be unable to bear it for extended periods of time. It is therefore very dangerous if the brake is released from hands.
2. While the brake 10 is held upward, the brake guide line is linked upward also. Therefore, the brake guide line is rubbed against with the fixed seat 11 of front end brake 10 and can be broken by the rubbing action.

SUMMARY OF THE INVENTION

The primary objective of the present invention is therefore to provide a brake mechanism for an auxiliary walker comprising a fixed seat, a control plate, and a hand grip. This arrangement reduces the work required when in use. The present invention is braked by a hand brake and a fixed brake.

The objective, features, functions, and advantages of the present invention will be readily understood upon a thoughtful deliberation of the following detailed description of the present invention with reference to the accompanying drawings.

DETAILED DESCRIPTION OF THE INVENTION

Figure 1:
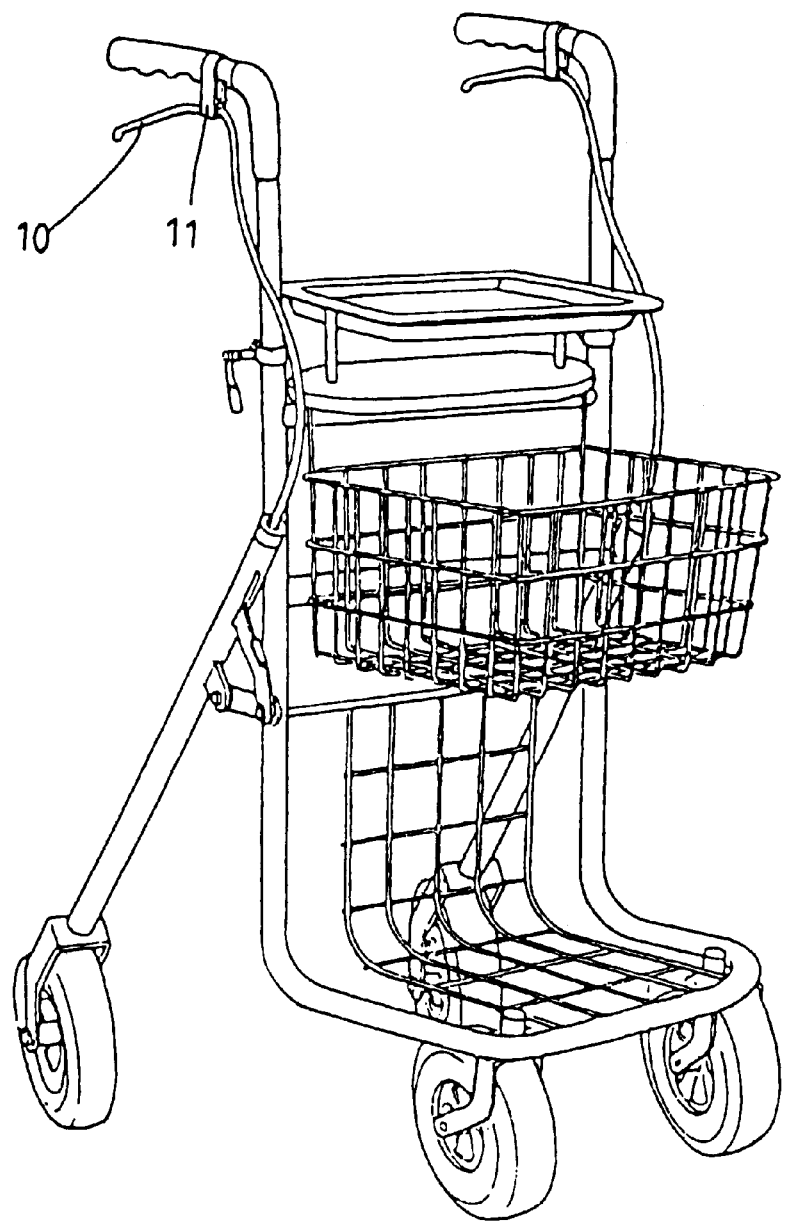
FIG. 1 shows a perspective view of the prior art auxiliary walker.
Figure 2:
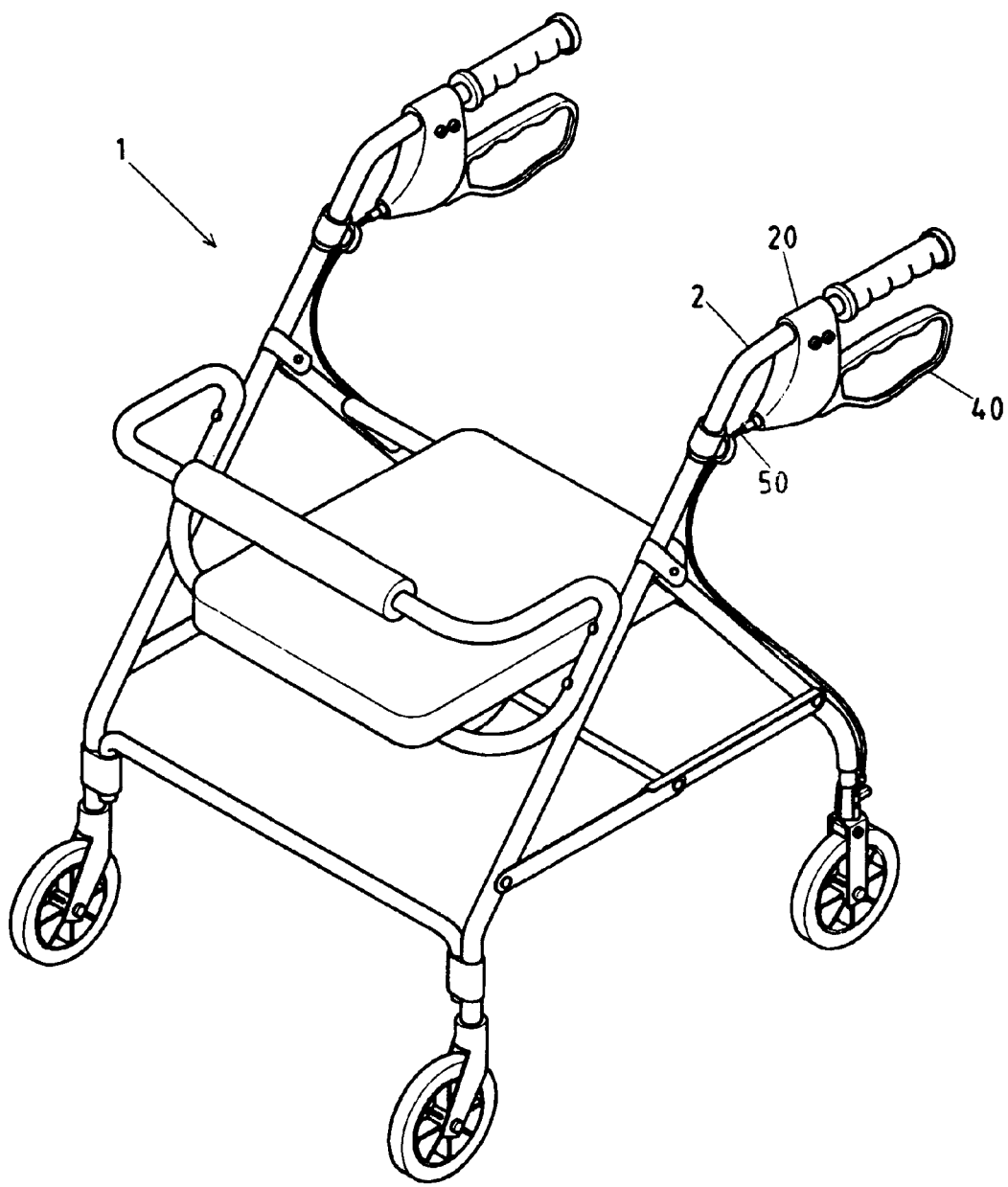
FIG. 2 shows a perspective view of the present invention in combination.
Figure 3:
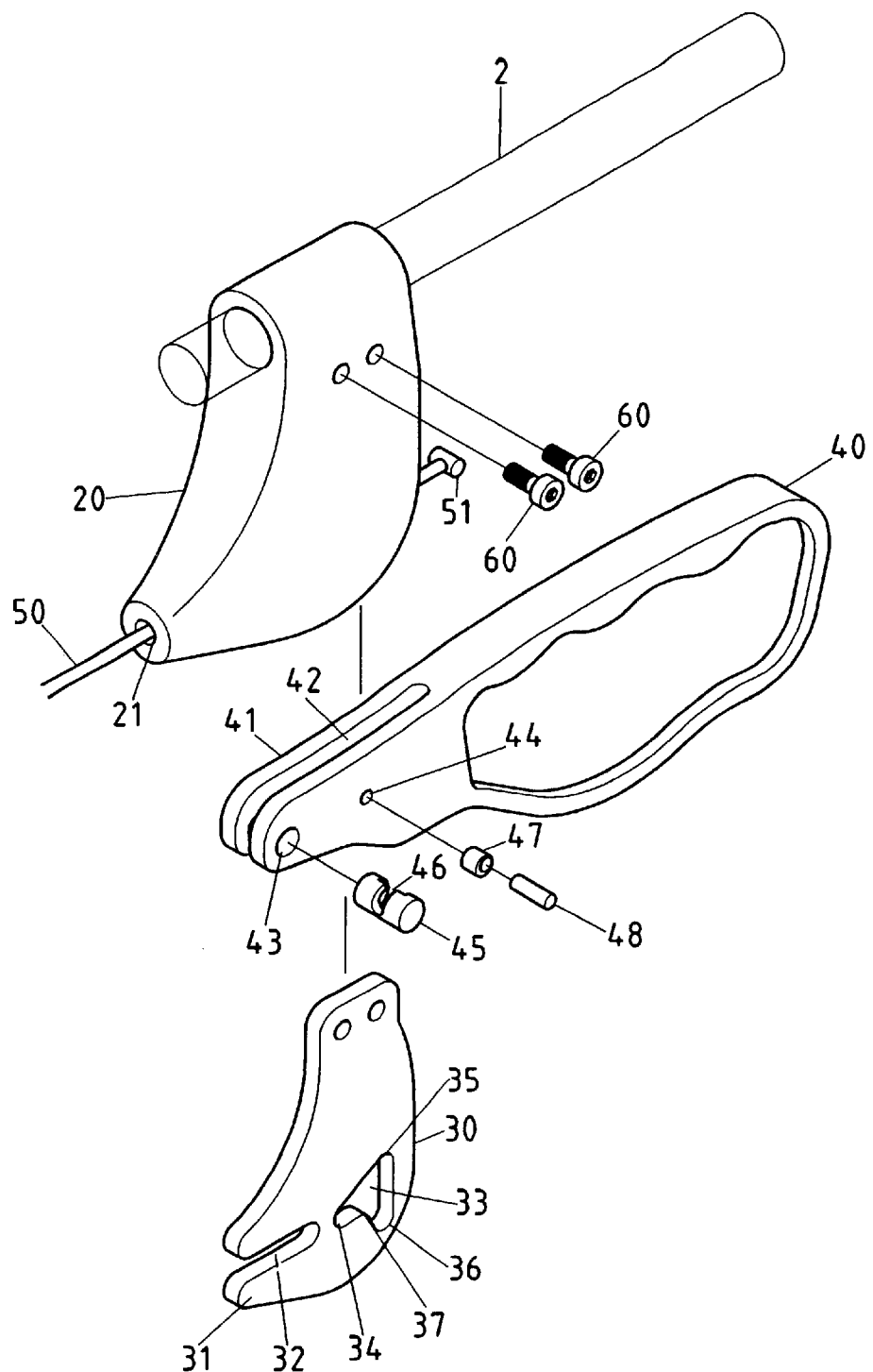
FIG. 3 shows an exploded view of the present invention.

As illustrated in FIGS. 2 and 3, a brake mechanism for an auxiliary walker of the present invention is composed of a fixed seat 20, a control plate 30, and a hand grip 40.

The fixed seat 20 is hollow at a handle 2 at one top end thereof provided with a hole 21 at one end of the thereof. The other end of the bottom of fixed seat 20 is an opening which enables the brake guide line 50 and the head end 51 to be attached to the said fixed seat 20.

The control plate 30 has an extended protrusion 31 at the bottom. The protrusion 31 defines a side of a horizontal guide slot 32 extending toward the center of control plate 30. In addition, the surface of control plate 30 adjacent to horizontal guide slot 32 has a triangle fixed formed therein. The hole 33 is provided with a first edge 34, a second edge 35 and a third edge 36. The first edge 34 horizontal and adjacent end of horizontal guide slot 32. The second edge 35 is extended at an angle from the back side of first edge 34. The third edge 36 is located at the bottom of fixed hole 33 facing the second edge 35. Moreover, between the first edge 34 and third edge 36 is formed an arcuate edge 37.

The hand grip 40 is provided with a connection edge 41, which has a long trough hole 42 formed therein so as to enable the control plate 30 to be inserted vertically. The front end of connection edge 41 is provided with a first shaft-receiving hole 43 and the inner side is further provided with a second shaft-receiving hole 44. The first shaft-receiving hole 43 of hand grip 40 is receives a shaft 45, which has a cut trough 46 in order to match with the shape of brake guide line 50 and head end 51, so that the brake guide line 50 and head end 51 are pulled outwardly from the inside of fixed seat 20 while retained within the cut trough 46 of shaft 45. In addition, the control plate 30 can be inserted from the top end or the bottom end of connection edge 41 of hand grip 40, so that the shaft 45 together with the brake guide line 50 and head end 51 are all received within the horizontal guide slot 32 of control plate 30. Furthermore, the fixed hole 33 of control plate 30 and the second shaft-receiving hole 44 of hand grip 40 are connected to each other pivotally by a shaft rod 48 of an eccentric bearing 47. At the same time, the control plate 30 and the connection edge 41 of hand grip 40 are inserted into the fixed seat 20 and fastened by a plurality of screws 60 at the top end of control plate 30 and fixed seat 20.

Figure 4:
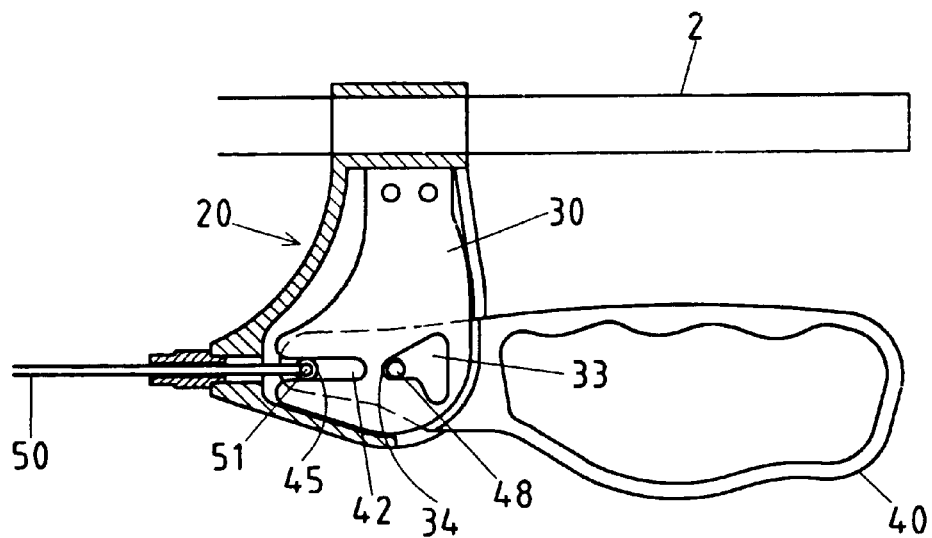
FIG. 4 shows a sectional view of the present invention in combination.
Figure 5:
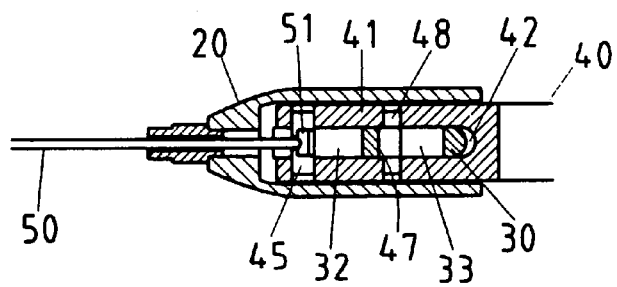
FIG. 5 shows another sectional view of the present invention in combination.
Figure 6:
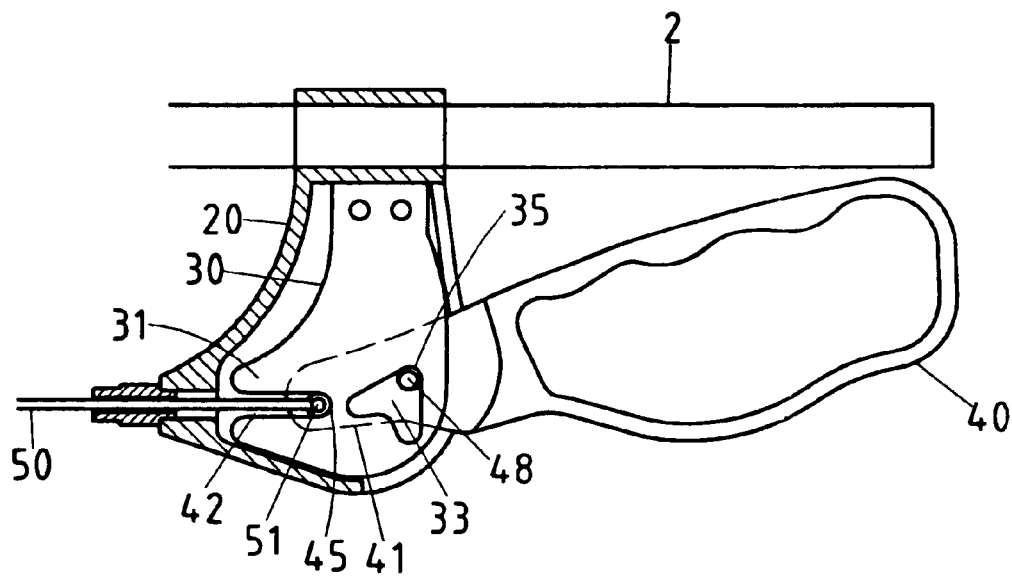
FIG. 6 shows a schematic plan view of the present invention in hand braking.
Figure 7:
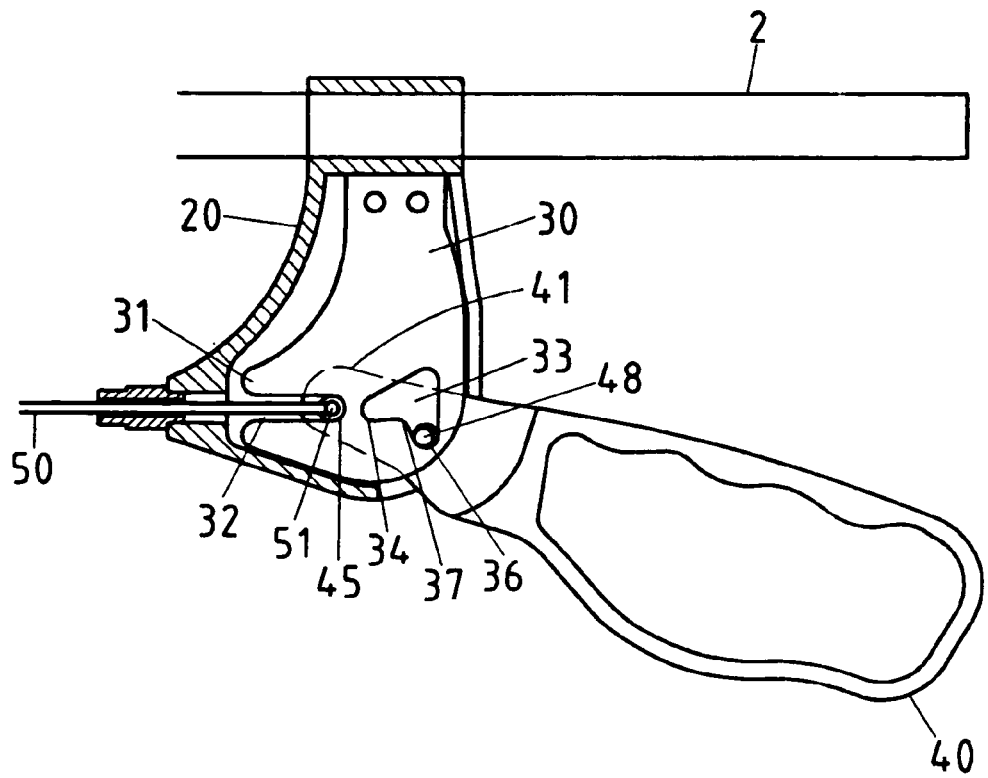
FIG. 7 shows a schematic plan view of the present invention in fixed braking.

The following is the description of the present invention in operation to achieve its desired effect:

As illustrated in FIGS. 4 and 5, the head end 51 of brake guide line 50 and the shaft 45 are located near outer end of horizontal guide slot 32 of control plate 30, and the shaft rod 48 is pivotally received within the eccentric bearing 47 of hand grip 40 located at the first edge 34 of fixed hole 33 of control plate 30 when the present invention is in ordinary use without braking. However, if the user wants to brake the auxiliary walker by the hand brake (as shown in FIG. 6), then the hand grip 40 is moved toward the handle 2. At the same time, the shaft 45 drives the head end 51 of brake guide line 50 to move moving horizontally toward the horizontal guide slot 32 of control plate 30, and the brake guide line 50 is moved straight also toward the fixed seat 20. Then the eccentric bearing 47 and shaft rod 48 of hand grip 40 are moved and retained at the second edge 35 of control plate 30. Such hand brake as previous described is convenient and laborsaving in operation. In addition, since the shaft 45 of hand grip 40 drives the brake guide line 50 moving horizontally toward the horizontal guide slot 32 of control plate 30, the brake guide line 50 is moved straight without rubbing with the fixed seat 20 and that the brake guide line 50 is not easily worn and torn. Therefore such brake mechanism is effective for the user who is weak in gripping. As illustrated in FIG. 7, the hand grip 40 is moved downward if the user wants to brake the auxiliary walker by a. The eccentric bearing 47 and shaft rod 48 of hand grip 40 are moved from the first edge 34 along the arcuate surface 37 and retained at the third edge 36. By taking the advantage of retaining the eccentric bearing 47, shaft rod 48, and arcuate surface 37 enables the hand grip 40 to remain be fixed downward. The user needs not to always hold the hand grip 40.

The embodiment of the present invention described above is to be deemed in all respects as being merely illustrative and not restrictive. Accordingly, the present invention may be embodied in other specific forms without deviating from the spirit thereof. The present invention is therefore to be limited only by the scopes of the following appended claim.

What is claimed is:

1. A brake mechanism for a walker comprising:

a fixed seat having a hollow interior, said fixed seat adapted to be attached to a handle of the walker, said fixed seat having a hole at one end of a bottom thereof, said fixed seat having an opening at an opposite end thereof;

a brake guide line having a head at one end thereof, said brake guide line extending through said hole of said fixed seat;

a control plate having an extended protrusion at a bottom thereof, said extended protrusion defining a side of a horizontal guide slot formed in said control plate, said horizontal guide slot opening at one edge of said control plate and extending toward a center of said control plate, said control plate having a triangular fixed hole formed in a surface thereof against an end of said horizontal guide slot, said triangular fixed hole having a first edge and a second edge and a third edge, said first edge being generally horizontal and having an end adjacent an end of said horizontal guide slot, said second edge extends at an angle upwardly from said end of said first edge, said third edge formed at a bottom of said triangular fixed hole and facing said second edge, an arcuate edge is formed between said first end and said third edge; and a hand grip having a connection edge, said hand grip having an elongated slot formed on said connection edge, said control plate received vertically through said elongated slot, said connection edge having a first shaft-receiving hole formed adjacent one end of said hand grip, said hand grip having a second shaft-receiving hole formed on an inner surface thereof and spaced from said first shaft-receiving hole, a first shaft received by said first shaft-receiving hole, said first shaft having a trough formed therein, said trough having a shape suitable for receiving said brake guide line and said head therein, said brake guide line and said head received by said horizontal guide slot of said control plate, said second shaft-receiving hole receiving a second shaft therein, said second shaft having a bearing rotatably mounted thereover within said elongated slot and within said triangular hole of said control plate, said control plate being fixedly mounted at a top end thereof within said fixed seat by a plurality of screws secured to said fixed seat.

* * * * *